March 20, 1962 K. HEIN ETAL 3,026,236
STAGE PAD AND LABEL REJECTOR
Filed Aug. 1, 1958 4 Sheets-Sheet 1

INVENTOR.
Kurt Hein and
Walter C. Hein

March 20, 1962

K. HEIN ETAL 3,026,236

STAGE PAD AND LABEL REJECTOR

Filed Aug. 1, 1958

INVENTOR.
Kurt Hein and
Walter C. Hein

BY
Mason, Porter, Diller & Stewart,
Attorneys.

March 20, 1962  K. HEIN ETAL  3,026,236
STAGE PAD AND LABEL REJECTOR
Filed Aug. 1, 1958  4 Sheets-Sheet 3

*INVENTOR.*
Kurt Hein and
Walter C. Hein
BY
*Mason, Porter, Diller & Stewart,*
*Attorneys.*

March 20, 1962 K. HEIN ETAL 3,026,236
STAGE PAD AND LABEL REJECTOR
Filed Aug. 1, 1958 4 Sheets-Sheet 4

INVENTOR.
Kurt Hein and
Walter C. Hein
BY
Mason, Porter, Diller & Stewart,
Attorneys.

United States Patent Office 3,026,236
Patented Mar. 20, 1962

3,026,236
STAGE PAD AND LABEL REJECTOR
Kurt Hein and Walter C. Hein, Vestal, N.Y., assignors to Eureka Specialty Printing Company, Scranton, Pa., a corporation of Pennsylvania
Filed Aug. 1, 1958, Ser. No. 752,612
27 Claims. (Cl. 156—355)

This invention relates to machines for applying label and like markings to articles, and is more particularly concerned with structures for assuring accurate location of such markings upon the articles, and for effecting the rejection and discarding of labels which are not to be applied to articles.

An object of the invention is the provision, in a machine for concurrently feeding the articles and label markings and for applying the markings to the individual articles, of means for supporting the article during the application of the marking thereto, with devices for permitting shifting of the article feeding means for accommodating articles of different thicknesses without significant variation of the effort exerted by the supporting means upon the article.

Another object is the provision, in such a machine having an article feeding system including a rockable stage system, of means mounted on the stage and effective for exerting a supporting or upward pressure effect upon a passing article, and coordinated means effective in the absence of an article for relieving the said supporting means.

A further object is the provision, in a machine for concurrently feeding articles and groups of labels with delivery of individual labels to individual articles, of means for applying differential pressures at selected areas of contact of the article and label to secure adhesion at such areas, and including devices for thereafter effecting contact and adhesion of the label and envelope at other areas thereof.

A further object is the provision, in a machine for concurrently feeding articles and groups of labels, wherewith certain labels may be improper for employment, with delivery of an individual article when a proper label is ready for application thereto and of preventing delivery of an article when an improper label is ready for delivery, of means responsive to the presence of an article adjacent the delivery point for procuring operation of an applying element and being effective in the absence of an article for effecting withdrawal of the applying element so that it does not hinder the discarding of an improper label.

A further object is the provision, in such a machine, of a stage system which responds to articles of uneven thicknesses, by movement about axes which are spaced at the delivery end and intersect adjacent the reception end.

A further object is the provision, in such a machine, of a stage system comprising positively driven feed rollers in which the stage with its feed rollers may be depressed and rock about fulcrum points as an article engages and is moved along the same, past a label affixing zone, together with a roller located at the said zone for ejecting improper labels from the machine independently of article movement, and means for controlling the position of the said ejection roller independently of the position of the stage.

A further feature is the provision of a machine for applying labels to articles, including means for assuring the regularity of position on the articles at which the labels are affixed.

A further feature is the provision of a machine for applying labels to articles, including a guide along which the articles are successionally moved, a stage system for engaging and moving the articles along the guide and resilient mounting means whereby the stage can yield as the article enters and moves therealong, and means for adjusting the stage spacing relative to the guide and for adjusting the effect of the resilient means.

A further feature is the provision of a machine for applying labels to articles, including a counting device which registers the number of labeled articles but does not respond to the passage of envelopes or labels alone.

With these and other objects in view as will appear in the course of the following description and claims, an illustrative embodiment of the invention in connection with the labeling of envelopes and like articles is shown in the accompanying drawings, in which:

Figure 1:
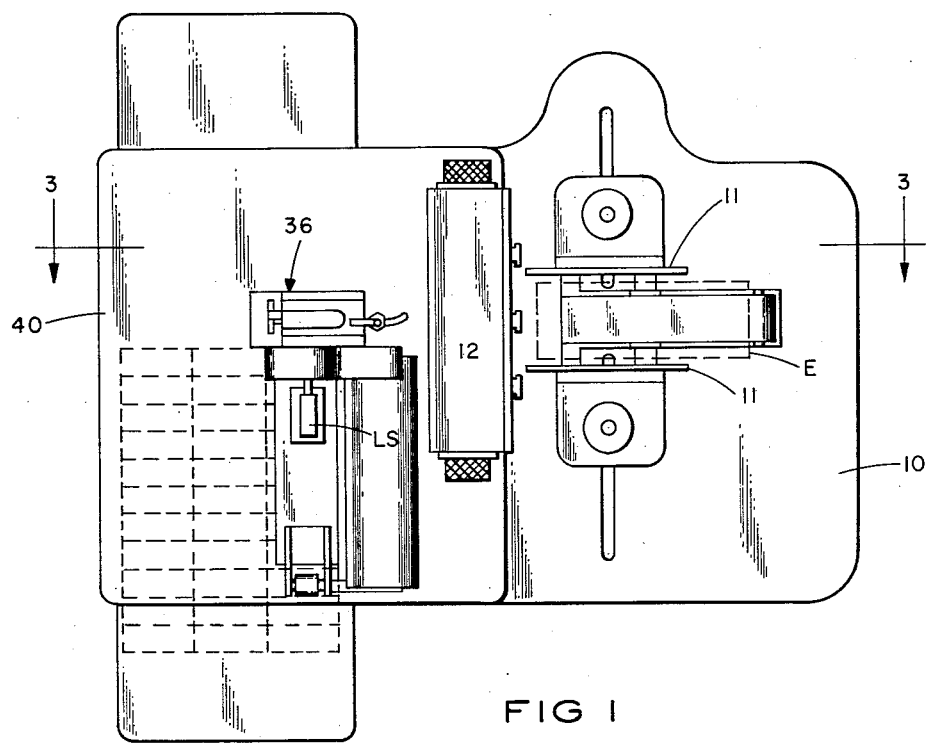
FIG. 1 is a top plan of an article labeling machine having article and label handling parts.
Figure 2:
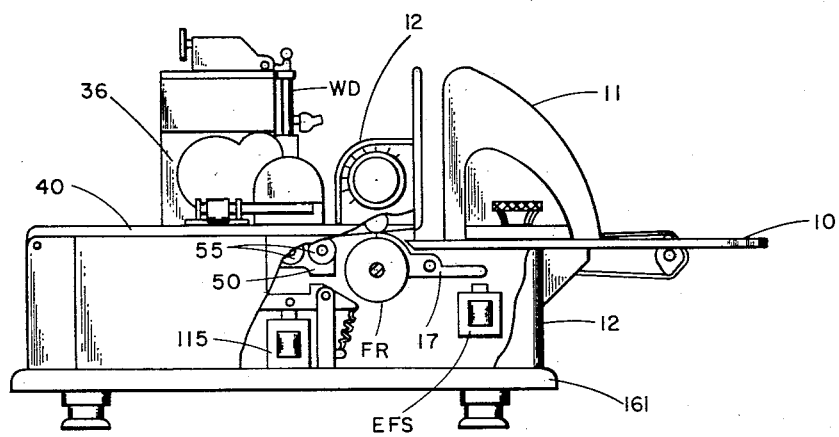
FIG. 2 is a side elevation of the machine, with parts broken away.
Figure 3:
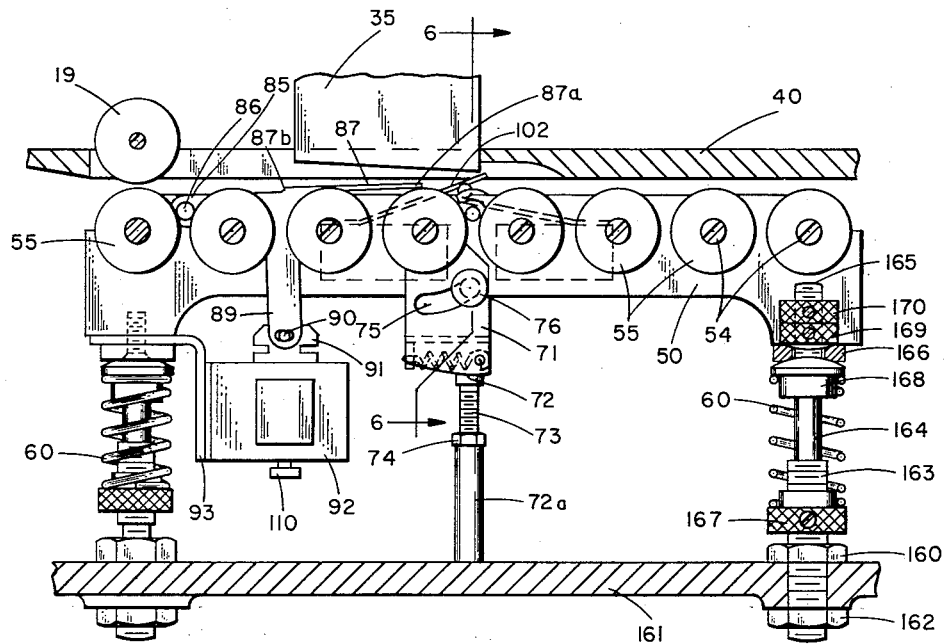
Figure 4:
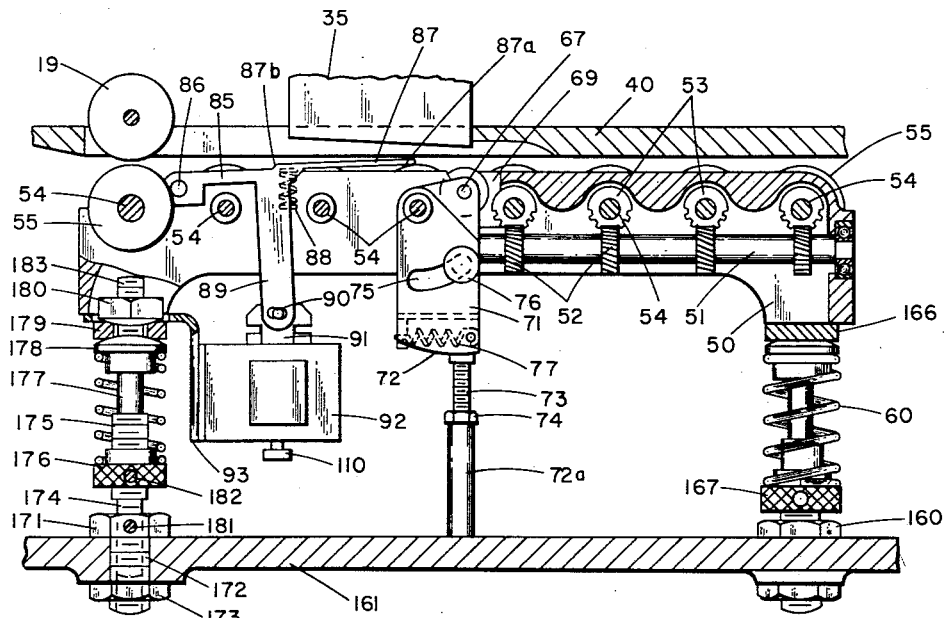
Figure 5:
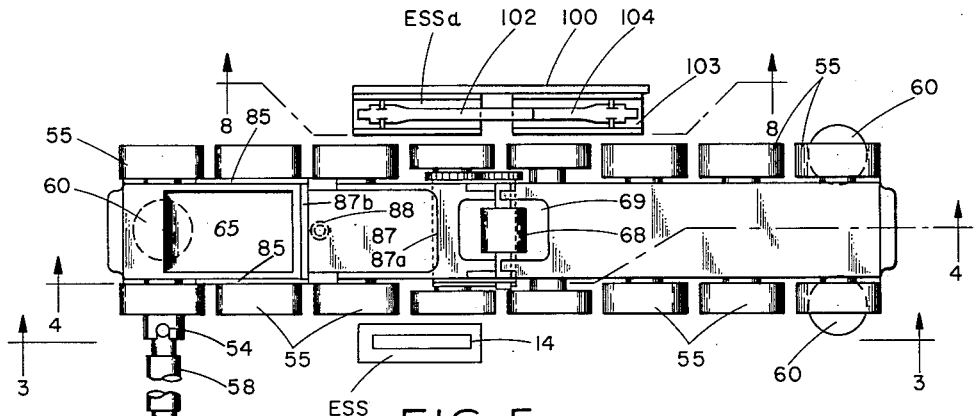
Figures 6, 7:
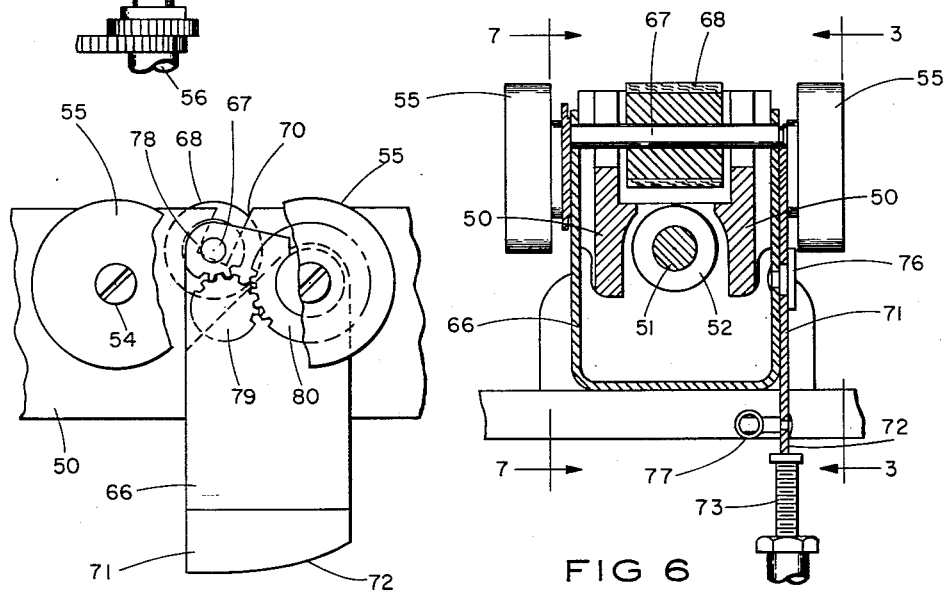
Figure 8:
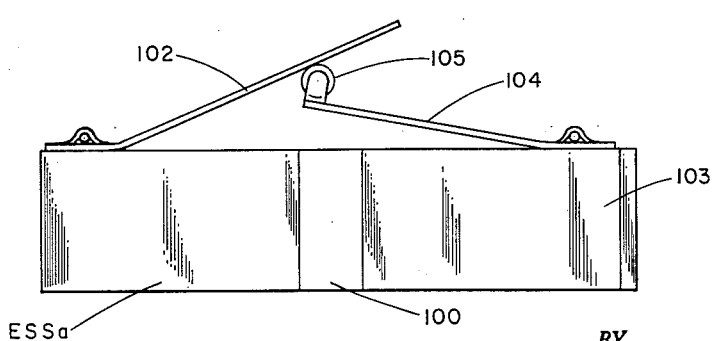
Figure 9:
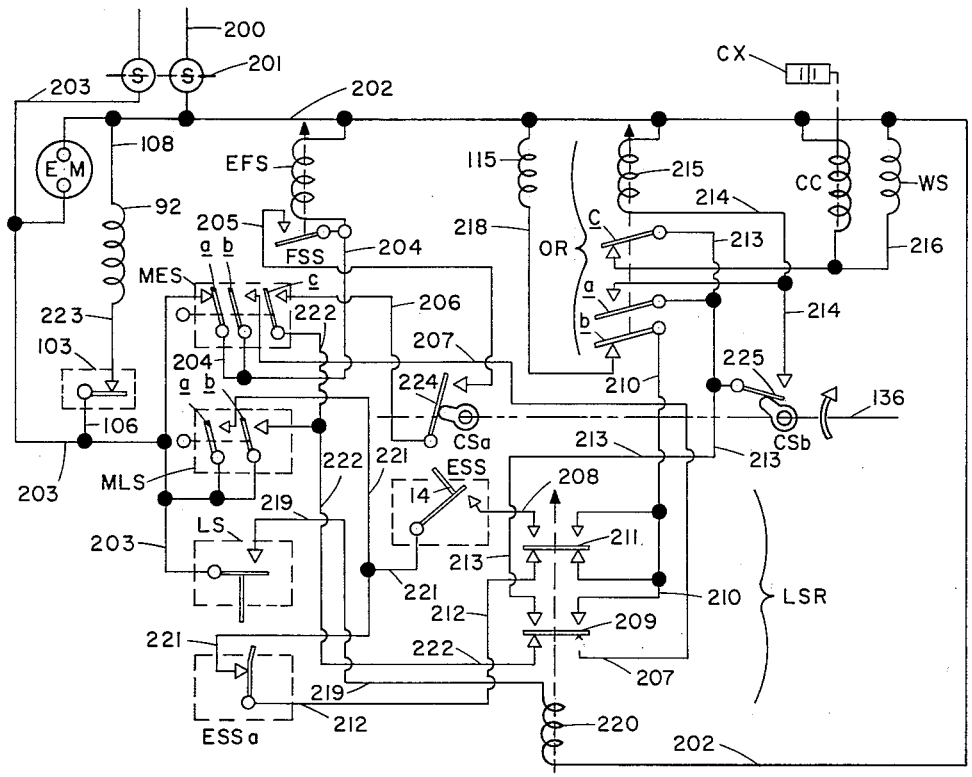
Figure 10:
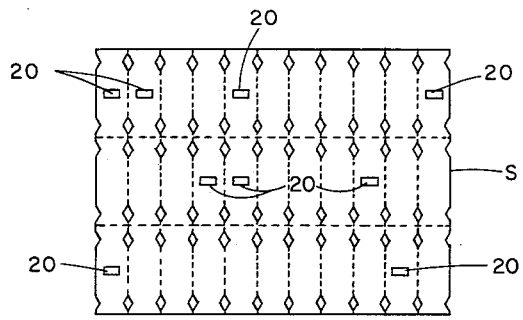

FIG. 3 is an upright sectional view, on a larger scale than FIGS. 1 and 2, substantially on lines 3—3 of FIGS. 1, 5 and 6;

FIG. 4 is an upright sectional view, substantially on the broken line 4—4 of FIG. 5;

FIG. 5 is a top plan view of the stage structure shown in FIGS. 3 and 4, with the machine top plate removed;

FIG. 6 is a transverse upright sectional view substantially on line 6—6 of FIG. 3;

FIG. 7 is an upright sectional view substantially on line 7—7 of FIG. 6;

FIG. 8 is an upright sectional view substantially on line 8—8 of FIG. 5;

FIG. 9 is a circuit diagram;

FIG. 10 is a view of a group of labels, on a slightly larger scale than in FIG. 1, of which some are proper for use upon envelopes and some are not.

In the drawings, the invention is shown as applied to a labeling machine for articles such as envelopes, post cards, etc., as described in detail in the Schneider Patent 2,754,022, and in the copending applications Ser. No. 596,980, filed July 10, 1956, by Schneider, Hein and Hein, now Patent No. 2,907,567, issued October 6, 1959, and Ser. No. 613,097, filed October 1, 1956, by Schneider, Howes, and Hein.

In FIGS. 1 and 2, the machine has a front table 10 with guide wings 11 for a stack of envelopes E or like articles which are selectively advanced one-by-one under control of separator devices including parts within a housing 12 and over a feed roller FR (FIG. 2) and thence beneath a rear table 40, and thence over a stage assembly shown in FIGS. 3-8 and including rollers 55 by which the article is advanced at constant speed beneath a punch aperture in the table 40, and thence out of the machine. During its movement, the article encounters the arm 14 (FIGS. 5 and 9) and thereby acts to close a switch ESS for energizing a solenoid 115 and thereby effecting closure of a clutch whereby power is taken from the motor EM (FIG. 9) for driving the label feeding devices including rollers FR and 55 at constant speed, and a cycle of movement is initiated by which a group of labels, e.g. forming a column in a label sheet S resting on table 40, is advanced with presentation of a first label over the punch aperture, then a punch 35 is caused to move downward in its housing 36 to sever this label from the rest of the group and deliver it through the punch aperture and onto the passing envelope, and then a retraction of the punch occurs with termination of the cycle by opening of the clutch with the punch in its initial position. During the cycle, the intermittent shaft 136 (FIG. 9) is started, turned through a revolution in the direction of the arrow in FIG. 9 and is brought to a standstill at its initial position. The cyclic movement also illustratively includes actuation of a wetting device WD by which the area of the article which is to receive the label is wetted, with retraction of the wetting device to prevent undesired wetting of other parts of the article; such device WD including a valve which when opened permits water to flow to the wetting head. Preferably this valve has a manual adjustment by which the degree of opening can be changed independently of the electrical tuning during a cycle as described hereinafter.

A label sensing switch LS is mounted for contact with the individual labels at the position occupied just before being advanced beneath the punch 35; if no label is present but conditions otherwise are proper, the switch LS controls circuits so that the clutch action is continued, with the label feeding devices actuated for procuring advancement of a newly inserted group of labels until the first label is effective for shifting the switch LS. The switch LS is effective in the absence of a proper label beneath it for closing a circuit and energizing an article feeding solenoid EFS (FIG. 2) so that the envelope feed fingers 17 are raised for preventing the feeding of an article until a label is ready for application thereto.

Structures and operations of this general type are set out and claimed in the aforesaid patent and patent applications, and the parts are shown conventionally herein as illustrative of devices to which the present invention may be applied.

According to the present invention, the switch LS can also enter an aperture 20 in the area of a label of sheet S (FIG. 10), and then controls circuits as though no label were present; that is, article feeding is prevented, and a clutch closure is procured so that the label, whose impropriety for application to an article is indicated by the aperture 20 in its area, is advanced beneath the punch 35, the punch brought down to sever this improper label and deliver it through the punch aperture, and the punch returned; noting that no article is then present to receive the "improper" label.

The stage body 50 (FIGS. 3-6) supports a shaft 51 beneath its top surface; this shaft 51 having helical gear portions 52 spaced along its length for individual meshing with the helical gear portions 53 on the transverse shafts 54 also mounted in the body 50 and projecting therefrom and having the pairs of stage rollers 55 on each shaft 54. A drive is provided to the left-hand shaft 54 (FIG. 5) from a constantly driven shaft 56 through universal joints 57 and a rockable and extensible shaft 58 whereby the shafts 51, 54 are all driven at constant speeds. The rollers 55 project in the illustrative form about 1/16 inch above the top of body 50 so that an article such as an envelope is supported and fed forward by these rollers 55 with the portions between the pairs of rollers 55 above the top of the stage body.

The stage is supported in vertical transverse planes through the axes of the end transverse shafts 54 by springs 60 with adjustable limiting devices as described hereinafter, whereby the uppermost position of the stage structure can be adjusted, for example with postal cards and empty envelopes so that the pair of rollers 55 at the left (FIGS. 3 and 4) are about 0.003 inch below the lower surface of the top plate 40, and the pair 55 at the right are 0.010 inch below said lower surface. The springs 60 permit the stage body to be depressed at one or both ends by the entry and presence of an envelope or other article between the rollers 55 and the top plate 40.

It is preferred to provide adjustment for the compressions of the springs 60, for example as shown in FIGS. 3 and 4. In FIG. 3, the parts for adjustment of the stage height and spring compression at the right-hand or discharge end of the stage are shown as comprising a bolt having a flange 160 below which is a threaded portion passing through the machine base plate 161 (FIGS. 2, 3 and 5) and secured by a nut 162. Above the flange 160, this stud bolt has a first threaded portion 163, a cylindrical portion 164, and a top threaded portion 165 which extends loosely through a bracket portion 166 secured to the bottom of the stage body 50. A spring-adjusting nut 167 is engaged with the portion 163 and supports the lower end of the spring 60. A sliding sleeve 168 having a spherical upper surface can move along the portion 164, and bears against the upper end of the spring 60: its spherical surface fits a like cavity in the bottom of the bracket 166. A nut 169 is engaged with the threaded portion 165, and has a spherical bottom surface for engaging a like cavity in the top of the bracket 166. A lock nut 170 is also provided on the threaded portion 165. When the height of the stage is to be adjusted at the position of the bolt, the lock nut 170 is loosened and the nut 169 rotated to a different position on the threaded portion 165, therewith changing the distances of the bracket 166 and the stage 50 from the base plate 161. When the desired height position is attained, the lock nut 170 is tightened again. In this operation, the distance between the spring engaging nut 167 and sleeve 168 may be increased or decreased, therewith changing the preliminary compression in the spring 60. If this spring pressure is too great, so that the upward pressing of the article against the top plate causes greater friction than desired for the particular articles, the nut 167 can be rotated on the threaded portion 163 to increase its distance from the sleeve 168: rotation in the opposite direction decreases such distance and increases the preliminary compression of the spring 60. The spherical surfaces permit the lateral and longitudinal tilting of the stage relative to the supporting structure.

In FIG. 4, a structure for similar purpose is shown at the left-hand or receiving end of the stage: since this end is less accessible than the right-hand end, provision is made for adjustment from a point near the base plate 161. A flange 171 has an extension 172 through the base plate, and is held by a nut 173. The extension 172 has a threaded bore for receiving the threaded portion 174 of a bolt which has a second threaded portion 175 for receiving the nut 176 which supports the lower end of the spring 60. The bolt has a cylindrical portion 177 on which slides a sleeve 178 for engaging the upper end of the spring 60, this sleeve having a spherical top surface for fitting a like cavity in the bottom of the support piece 179 secured to the bottom of the stage body 50. The bolt extends through the piece 179 and receives a nut 180 on an upper threaded portion 183, this nut having a spherical lower surface acting in a like-shaped cavity of the piece 179 and serving to limit the upward movement of the stage. As with the structure shown in FIG. 3, the spring compression can be adjusted. The flange 171 and nut 176 are illustrated as having radial binding screws 181, 182: normally both screws are tight, to prevent loss of adjustment. When the screw 181 is loosened, the nut 176 can be rotated, therewith driving the bolt through screw 182 and causing the threaded portion 174 to turn in the threaded extension 172 and therewith raising or lowering the bolt so that its top nut is brought to a different distance from the base plate 161. When the screw 182 is loosened and the screw 181 left tight, rotation of the nut 176 causes it to move on the threaded portion 175, for change of the spring preliminary compression as desired, whereupon the screw 182 is tightened again.

One of the transverse shafts 54, in the illustrative form, provides a pivot on the stage body for a rockable U-shaped member 66 which extends downwardly and across beneath the stage body 50 (FIG. 6). This member 66 provides bearings for a transverse shaft 67 at a pivot axis eccentric to the member pivot: a rubber-faced roller 68 is fixed on the shaft 67 and is located in a cavity 69 on the body 50 (FIGS. 4, 5 and 6) so that it projects above the same, and can move upward and downward relative thereto, with the shaft 67 traveling in the notches 70 (FIG. 7) of the body. In the illustrated form, the vertical plane through the axis of the shaft 67, with the parts in the uppermost position as illustrated, is about 1/16 inch to the left in FIG. 4 from the right-hand face or edge of the punch 35; that is, the edge of the punch aperture in top plate 40 is about 1/16 inch to the right of the top generatrix of the roller 68, and the swinging of the member 66 does not essentially vary this relationship for any relative movement of the stage body 50 and the member 66.

Also pivoted about the same axis as the member 66 is a cam piece 71 having a lower edge 72 which is illustratively a circular arc having its center at the above described position of the axis of shaft 67. A support 72a is connected to the base plate 161 and has an adjustable screw stop 73 therein, which can be locked in position by the nut 74. The upper end of screw 73 bears against the edge 72 and provides support therefor, essentially along an upright line which in the illustrated position of parts extends through the axis of the shaft 67. A slot 75 in the piece 71 is arcuate about the pivot axis at shaft 54, and receives a pin 76 secured in the member 66; in the illustrative position, the pin 76 is on the upright line through the axis of shaft 67 and the support 73. A coil spring 77 is connected at its right-hand end (FIG. 4) to the piece 71 and at its left-hand end to the member 66.

As shown in FIG. 7, a gear 78 is fixed on the end of the shaft 67 and is in mesh with an idler gear 79 mounted on the member 66; and this idler 79 is in turn in mesh with a gear 80 fixed on the shaft 54 which provides the pivot for the member 66. By this arrangement the roller 68 is driven in the same direction as the stage rollers 55; by having the gear 80 of a greater number of teeth than gear 78, the peripheral velocity of the roller 68 is greater than that of the stage rollers 55.

A pair of parallel lever arms 85 are mounted for movement about axially alined pins 86 on the stage body 50 (FIGS. 3 and 4), and are connected by a pad plate 87 having a right-hand edge 87a (FIG. 5) beneath the punch 35 and located in the illustrative form about one-fourth of the punch length from the right-hand edge of the punch 35, FIG. 4. A spring 88 acts to lift the pad plate 87 with spring reaction against the stage body 50. Downward extensions 89 of the arms 85 are connected by a pivot pin 90 to the core 91 of a solenoid 92 mounted on a bracket 93 secured to the stage body 50.

Supported by the general frame is a bracket 100 (FIGS. 5 and 8) upon which is mounted a normally closed switch ESSa and a pivoted arm 102 which extends upward at an angle (FIGS. 3 and 8) above the top of the stage rollers 55 so that this arm is engaged and rocked clockwise by a passing article such as an envelope so that the switch ESSa is opened and remains open so long as the envelope engages the arm 102. The bracket 100 also supports a second normally closed switch 103 having a pivoted actuating arm 104 with a roller 105 which is moved by the arm 102 during the envelope-induced downward movement thereof described above, with an opening of the switch 103. As shown in FIG. 9, a branch 108, of the power conductor 202 leads to the solenoid 92, thence by conductor 223 to the switch 103, and thence by conductor 106 to the other power conductor 203. Thus, when there is no envelope on the stage the switch 103 is closed, and the solenoid 92 is energized so that the pad plate 87 is retracted downward below the level of the stage rollers and the top of the stage body 50. On the other hand, when an envelope is present, the switch 103 is opened and the solenoid 92 is de-energized, so that the spring 88 raises the pad plate 87, until the stop piece 110 on the core 91 of the solenoid 92 encounters the bottom of the solenoid structure: in which condition, the pad plate 87 has its right-hand end 87a higher than its left-hand end which preferably is beveled to facilitate the passage of the envelope onto the pad plate 87. The bottom surface of the punch 35 is preferably sloped or inclined to give a shearing cut along the label: and an illustrative shape and adjustment causes the right-hand edge of the punch in FIG. 4 to reach a maximum of 0.020 inch below the bottom reference surface of the table 40, and the left-hand edge a distance of 0.017 inch: that is, the punch surface is 0.003 inch lower at the right-hand edge than at the left-hand edge.

It is preferred to provide a recess or well 65 (FIG. 5) on the upper surface of the stage body 50, beneath the position of the wetting device which acts as described in the said Schneider Patent 2,754,022, and in the aforesaid copending application Serial No. 613,097, filed October 1, 1956. This well can receive drip from the wetting device, and thus prevent the wetting of the bottom surface of an envelope which may later pass over the stage, and also prevent the flow of water downward over the sides of the stage body.

In the illustrated form (FIGS. 3, 4 and 5) the stage body is controlled by a single spring 60 and adjustable stop 180 at the left-hand or receiving end in FIG. 5, and by a pair of transversely spaced springs 60 and stops 169 at the right-hand or discharging end. It has been found that such a system can be more easily adjusted for equal spring resistance than a system employing two pairs of springs, i.e. a pair at each end. In addition, when the article has variance in transverse thickness, as with an envelope having enclosed material thicker along one longitudinal edge than the other, the stage can then respond by tilting about an axis extending from the top of the stop at the left-hand or receiving end in FIGS. 3-5, and through the top of a stop at the right-hand end which underlies the thinner part of the envelope; and this differential yielding of the two stage rollers 55 at the outer end assures a regular power grip upon the article between these rollers 55 and the overlying top power rollers 19; wherewith the stage height above each spring 60 can be differentially adjusted so that the two sides of the stage are displaced downwardly by substantially equal distances when an article of wedge-shaped cross-section is on the stage, but it will be understood that such laterally unequal adjustments are not required for minor differences of thickness from side to side of the article. Likewise, the adjustment of the stage mounting members can be utilized in providing for thicker and thinner articles, noting that a thick article causes a greater downward movement of the stage than a thin one; in cases of major variation from a run with post cards, for example, to a run with thick magazines, the stage is lowered by reducing the heights of hold-down members 169, 180 as described above, so that a greater space is provided between the rollers 19, 55, and the angle between the tangent planes of these rollers at the lines of contact of the articles therewith is reduced for decreasing the shock as the rollers receive the leading edge of the articles.

The circuit diagram in FIG. 9 reproduces parts shown in the copending application Serial No. 613,097 of Schneider, Howes and Hein, filed October 1, 1956, to which application reference is made for the several parts and operations not specifically described below; and with inclusion therein of the switches ESSa and 103 and the solenoid 92 described above. In FIG. 9, supply conductors 200, 203 are connected to a source of electrical current. When the main switch 201 is closed, current flows to conductor 202 and operates the electric motor EM, with return to conductor 203. This motor EM is connected for driving the feed rolls FR, the shaft 56 and therewith the stage rollers 55 and 68, and operates through a clutch for producing cyclic movements, with a descent and return of the punch 35 in each cycle, and effecting the operation of an intermittent feeder for moving the label sheet S by one label area for each cycle: forms of such connections are shown in the aforesaid patent and patent applications, and are here abbreviated as including the solenoid EFS (FIGS. 2 and 9) for operating the article feed fingers 17. When solenoid EFS is energized, the fingers 17 are lifted to stop article delivery. This solenoid is connected to conductor 202 and also by conductor 204 to one contact set *a* of a manual envelope switch MES which in the left-hand position of the switch is connected to conductor 203. The conductor 204 also leads to a second contact set *b* in switch MES which is closed when the switch MES is in its right-hand position, and thence by conductor 207 to a contact of a label switch relay LSR, this relay contact being closed at bridge 209 when the solenoid 220 of the relay LSR is deenergized, and continuing therefrom by conductor 222 to a contact set *b* in a manual label switch MLS which is closed when the switch MLS is in the right-hand position for automatic label feed, and also to a contact set *c* in the envelope switch MES which is closed when this switch is in the right-hand position for automatic envelope feed. The conductor 204 is also connected to a switch FSS which is closed when the solenoid EFS is energized, and thence by a conductor 205 to a cam switch 224 controlled by the cam CS*a* on intermittent shaft 136, this cam switch 224 being opened when a cycle is being completed and then being closed shortly after the start of each cycle and remaining closed during the course of each mechanical cycle until near its end; from the cam switch 224, the connection extends by conductor 206 to the contact set *c* in the envelope switch MES which is connected to the aforesaid conductor 222. The energizing solenoid 220 of the label relay LSR is connected between conductor 202 and a conductor 219 which leads to the label switch LS, with return to conductor 203; when there is a proper label beneath switch LS, this circuit will be closed and the relay LSR energized.

A solenoid 115 is effective when energized for starting a cycle of operation. This solenoid 115 is connected to conductor 202, with current flow from the solenoid by conductor 218 to a contact set *b* of an operation relay OR, this contact set *b* being closed when the coil 215 of the relay OR is de-energized, so that current can flow by conductor 210 toward contacts of the label relay LSR. One of the contact sets in relay LSR is normally closed at bridge 211 and permits current to flow, when the solenoid 220 of the relay LSR is de-energized, to a conductor 212 and thus to the switch ESS*a*, with a return by conductor 221 to another contact set *a* of the label switch MLS (which is closed when the switch MLS is in its right-hand position) and thence to conductor 203. The conductor 210 also leads to a normally open contact of relay LSR which is closed by the bridge 211 when the relay coil 220 is energized, and then by conductor 208 to the normally open envelope sensing switch ESS so that when switch ESS is closed by an article, current flow may occur to the conductor 221 as set out above.

The relay LSR in the illustrative practice has the bridges 209 and 211 for selectively opening and closing circuits at four points: a time delay of a fraction of a second is provided between the opening of the lower sets of contacts in FIG. 9, before the closing of the upper sets of contacts.

The operation relay OR has an actuating solenoid 215 which is connected between conductor 202 and a conductor 214 which leads to a cam switch 225 operated by cam CS*b* on shaft 136 so that this cam switch 225 is momentarily closed after the beginning of a cycle and then opens again and remains open for the rest of the cycle. This cam switch 225 is connected to a conductor 213 extending to a normally open contact of a bridge 209 of relay LSR; so that upon energization of the relay solenoid 220, current can flow into conductor 210. For maintaining energization of the relay OR, a branch of conductor 214 extends to a normally open contact *a* of relay OR and thence is connected to conductor 213.

As described in the aforesaid patent and patent applications, wetting devices are provided for time operation. In the circuit diagram of FIGURE 9, a solenoid WS is provided for actuating a water-replacement device in the wetting system and is connected to conductor 202, with current flow by conductor 216 to a normally closed contact *c* of relay OR, and thence to conductor 213. When the wetting device solenoid WS is energized, the water valve of the wetting device WD (FIG. 2) is opened: when the solenoid WS is de-energized, the valve closes and water flow stops. Thus by changing the angular position of the cam CS*b* on the intermittent shaft 136, the duration of water flow during a cycle can be determined: that is, the later the cam switch 225 is closed during the cycle, the greater the quantity of water which is delivered during such cycle.

A solenoid CC is connected between conductors 202 and 216 so that it is energized when the switch ESS is closed by an article during automatic running of the machine and thereupon steps a counting device CX by one unit. When the cam switch 225 closes during the cycle of shaft 136, the energization of solenoid coil 215 of the relay OR causes contacts *c* of this relay to open so that the solenoid CC is de-energized and the counter drive returns to position for the next counting operation.

The energization of the solenoids WS and CC is by conductors 213, 210 and under control of the relay LSR. When the relay LSR is in its lower or de-energized position, the conductor 210 is open at the upper contacts of bridges 209 and 211 while the lower contacts of bridges 211 are closed; upon sensing of a label by label switch LS, coil 220 is energized and moves its bridges; wherewith the circuit from conductor 210 to conductor 212 is broken by bridge 211 before contacts are made by bridge 209 between conductors 213 and 210 and by bridge 211 between conductors 210 and 208 and by the latter conductor to the envelope switch ESS so that this envelope switch then controls the energizing of the solenoids WS and CC; and there is no false energization as might occur if the conductor 213 were connected to conductor 212 and thence through the normally closed auxiliary envelope switch ESS*a*. A like effect occurs for coil 215 by the successional opening and closing of the stated contacts.

As stated above, the stage solenoid 92 is connected between conductors 202 and 223 with the latter leading to the switch 103, wtih a return to conductor 203.

The operation of the electrical system may be assumed to begin with a label sheet S in position and having a proper label beneath the label switch LS so that this switch is closed, and with a supply of envelopes ready for feeding into the machine. The manual envelope switch MES will be assumed to be in the right-hand position for normal operation of the machine; and correspondingly the manual label switch MLS will be in its right-hand position. It will be assumed that the switch 201 has been closed, and the motor EM started, but that an envelope has not yet been feed. The envelope feed solenoid EFS is de-energized, and the feed fingers 17 are lowered so that envelopes can feed. The intermittent shaft 136 is at a standstill at the end of a cycle and the clutch solenoid 115 is de-energized. The operation relay solenoid 215 is de-energized. The wetting solenoid WS and the counter solenoid CC are de-energized. The envelope switch ESS is open, and the envelope switch ESS*a* is closed. The switch 103 is closed.

Since a proper label is beneath the switch LS, this switch is closed and current flows from conductor 202 through solenoid 220, conductor 219, and label switch LS to conductor 203: solenoid 220 is energized, and the relay LSR closes the bridge 211 between conductor 210 and conductor 208, and also closes the bridge 209 between conductors 210 and 213.

Since the cycling shaft having the cams CS*a* and CS*b* is at a standstill at the end of cycle, a current path can be tentatively established from conductor 202 by solenoid EFS and conductor 204 to contact *b* in the manual envelope switch MES and, when the switch MES is in the right-hand position, the tentative circuit is by conductor 207 to normally closed contacts of relay LSR, but this path is open at bridge 209 due to energization of the solenoid 220, so that solenoid EFS is not energized and an envelope can be fed.

Likewise the tentative path by the branch of conductor 204 which leads to contact a in the manual envelope switch MES is open, with this switch in the right-hand position, and the solenoid EFS is not energized by this path. Further, since the solenoid EFS is de-energized, its switch FSS is open, and there is no current flow from conductor 204 to conductor 205 by which the solenoid EFS might be energized.

(A) Automatic Application of Proper Labels to Articles

When the envelope is in movement through the machine, being gripped by the rollers 19, 55 (FIGS. 3 and 4), it encounters the envelope sensing switch ESS and closes the same so that a cycle of operation can be begun. This cycle is initiated by energizing the solenoid 115, with current flow from conductor 202 through the solenoid 115, conductor 218, normally closed contact b in the relay OR, conductor 210, bridge 211 of relay LSR, and since the coil 220 of relay LSR is energized and the bridge 211 is engaged with its upper contacts, the flow continues by conductor 208, envelope sensing switch ESS, conductor 221, contact a of the label switch MLS, back to conductor 203.

After the cycle has started, cam CSb momentarily closes its switch 225 so that current can flow from conductor 202 through solenoid 215 of the operation relay OR, conductor 214, the cam switch 225, conductor 213, bridge 209 of relay LSR, and since the coil 220 is energized and the bridge 209 engaged with its upper contacts, the flow continues by conductor 210, bridge 211 of relay LSR, conductor 208, through the envelope switch ESS which remains closed so long as the envelope is in contact therewith, conductor 221, and thence by contact a of label switch MLS back to conductor 203. Operation relay OR is thus energized, and at contact b opens the circuit between conductors 218 and 210, so that the cycle initiating solenoid 115 is de-energized and the mechanical cycle will be stopped when a single full revolution of shaft 136 has been performed. The operation relay OR also closes a contact a so that maintaining current can flow from conductor 214 regardless of the position of the cam switch 225 controlled by the cam CSb, to the conductor 213; and hence the operation relay OR remains energized as long as the envelope holds the switch ESS closed. The operation relay OR also moves contact c to open the circuit between conductors 216 and 213, so that the wetting control solenoid WS and the counter solenoid CC are de-energized.

During the course of the cycle, the label is applied to the envelope, and a new label area is advanced to position beneath the label switch LS. When the envelope has passed the switch ESS, this switch opens so that the maintaining circuit for the operation relay OR is opened, noting the path 215—214—OR—a—213—raised bridge 209—210—raised bridge 211.

(B) Rejection of Improper Labels

In the event that a label having a perforation 20 therein (FIGURE 10) is advanced to position beneath the label switch LS, such a label being termed herein an "improper" or "reject" label, the label switch LS is opened, and current flow to the solenoid coil 220 is interrupted, so that the relay LSR is de-energized. In such a case, current can flow by the path 202—115—218—contact b of relay OR—210— lowered bridge 211 of relay LSR—212—switch ESSa which is closed with no envelope present—221—contact a of manual label switch MLS—203, so that solenoid 115 is energized and a mechanical cycle is started, during which the punch 35 descends, detaches the improper label and delivers it to the ejection roller 68 so that this label is carried away from the punch opening. This initiation of a "reject" cycle only occurs when there is no envelope in contact with switch ESSa: hence, if the preceding labeled envelope has not cleared the switch ESSa, the switch is open and a new cycle cannot be started to effect removal of the "improper" label until the envelope has passed from the switch ESSa, that is (noting FIGS. 3, 4 and 5), until the preceding envelope has gone past the position at which a promptly-punched "improper" label can be deposited upon it. De-energization of relay LSR also closes a path from conductor 202 through the envelope feed solenoid EFS and thence by 204—contact b of MES—207—lowered bridge 209 of relay LSR—222—contact b of MLS—203: solenoid EFS is energized, and raises the envelope feed fingers 17 (FIG. 2) so that no envelope feed to the punch position occurs until a proper label again is presented for closing the label sensing switch LS. Also, the energization of solenoid EFS closes the switch FSS so a tentative path is established from conductor 202 through solenoid EFS to conductor 204 and thence by switch FSS and conductor 205 to the switch 224 which is controlled by the cam CSa; but since the shaft 136 is at the beginning of a cycle, the switch 224 is open so that energization of the solenoid EFS is still controlled by the relay LSR. The closure of switch 224 does not initiate energization of the solenoid EFS, but can act to maintain its energization after the switch FSS, controlled by the solenoid itself, has been closed. Shortly after motion of the shaft 136 begins, the switch 224 closes and the above tentative path through solenoid EFS and switch FSS to the switch 224 now continues by conductor 206 to contact c of switch MES, and thence by conductor 222 to contact b of switch MLS, and to conductor 203. Thereafter as long as the cam CSa leaves the switch 224 closed, current by this path can energize the envelope feed solenoid EFS and prevent envelope feeding until the end of this mechanical cycle, when switch 224 is opened again. Hence there is no envelope present beneath the punch 35 when it descends to sever and procure ejection of the improper label. It is to be noted that if a second improper label is next fed after the first improper one, and an envelope has been stopped at the feed fingers 17 upon the de-energization of relay LSR when the first improper label was sensed, by the closing of the circuit through solenoid EFS—204—contact b of switch MES—207—bridge 209 of relay LSR—222—contact b of switch MLS—203, and also during the major course of the mechanical cycle for rejecting the first improper label by the closing of the circuit EFS—204—switch FSS—205—switch 224—206—contact c of switch MES—222—contact b of switch MLS—203; then the envelope remains stopped by the fingers 17 until the end of the prevailing cycle during which the first improper label is being rejected and also while the immediately following improper label or labels are being detected, severed and rejected; that is, so long as no proper label comes to the label sensing switch LS and effects energization of the relay solenoid 220. Thus if two or more consecutive improper labels are sensed, a new mechanical cycle is immediately initiated for each by circuit closure through solenoid 115 at the bridge 211 of relay LSR, and the energization of solenoid EFS is continued at the bridge 209 of relay LSR so that no envelope is permitted to pass to the punch opening. Further, although the successive labels (FIG. 10) have uncut portions adjacent the illustrated transverse perforations, so that the switch LS is actuated during the course of each label feeding, there is no corresponding partial envelope feeding because the maintaining circuit through solenoid EFS and the switches FSS and 224 is independent of the relay LSR and remains energized during the course of the cycle while label feeding is occurring: that is, the control by the switch LS for permitting envelope feeding is limited to the close of the mechanical cycles, when the switch 224 is opened by the cam CSa.

When a proper label is sensed by switch LS after the rejection of an improper one, the circuit through solenoid EFS and bridge 209 of relay LSR is opened, and the circuit through solenoid EFS and switch FSS is open at switch 224 at the end of the previous mechanical cycle, so that solenoid EFS is de-energized, the fingers 17 permit the next envelope to pass them and move until it encounters the envelope sensing switch ESS and procures the start of a new mechanical cycle as in A above, by which this envelope receives the proper label which has been sensed. In the event that an envelope has partially passed the fingers 17 during a cycle when a proper label has been applied to an earlier envelope, and then an improper label is sensed, the fingers 17 immediately grip the envelope and prevent it from attaining position beneath the punch opening. If a proper label then follows the improper one, and the fingers 17 were immediately lowered, the partially advanced envelope might encounter switch ESS before the prevailing cycle was completed and therewith the label could be applied at an undesired part of such envelope. However, since the energization of solenoid EFS was being controlled by switch 224 during the preceding cycle, the partially fed envelope is detained until this preceding cycle has been completed and cam CSa opens the switch 224. This preceding cycle has brought the proper label forward for sensing by switch LS, and thus solenoid 220 of relay LSR has been energized. The circuit through clutch solenoid 115 is then opened by bridge 211 between conductors 210 and 212 so that a new cycle cannot be started immediately by the further path ESSa—221—contact a of switch MLS—203. Bridge 211 therewith sets up the circuit for clutch solenoid 115, between conductors 210 and 208, so that the envelope sensing switch ESS is placed in charge as in A above, and the clutch solenoid 115 is energized when the enevolpe attains the desired position of feeding advancement to be wetted and have the label applied at the desired place.

The bridges and contacts in relay LSR are so constructed that the new circuit is made at bridge 209 between conductors 213 and 210 after the circuit is broken at bridge 211 between conductors 210 and 212: and hence no pulse passes through conductors 213 and 216 for energizing the solenoids CC and WS, so that there is neither a counting at device CX nor a replenishment of water at the valve WD merely by movement of the relay LSR.

Also, although the switch at cam CSb momentarily closes, current flow is interrupted at bridge 211 of relay LSR, and the operation relay OR remains de-energized.

(c) *Envelope Feeding Without Labeling*

During adjustments preparatory to a run of envelopes of a particular size, material, filling, etc., it is desirable to avoid the use of the label controls and to have continuous successional feed of envelopes only, without presence of labels at the switch LS.

Assuming that the envelope switch MES is in its right-hand position as in A and B above, the label switch MLS is moved to its left-hand position, thus opening its contacts a and b. The circuit from conductor 202 through EFS—204—contact a of MES—203 is broken at such contact a. The circuit from conductor 202 through EFS—204—contact b of MES—207 is closed at bridge 209 of relay LSR because there is no label for closing switch LS and energizing the solenoid 220: this tentative circuit continues by conductor 222 to contact b of switch MLS but is open at that contact. The branch of conductor 222 to contact c of switch MES leads through this closed contact to conductor 206 which is not connected to the return conductor 203. Accordingly there is no energization of the solenoid EFS, and the fingers 17 permit continued successional feed of envelopes so that the operator can make adjustments and assure an optimum operation of the envelope handling devices. As each envelope encounters the switch ESS, this switch is closed, but there is no current flow therethrough because bridge 211 of relay LSR is open between conductors 210 and 208. When the envelopes encounter and open the switch ESSa, no action occurs because current flow through the conductor 221 from switch ESSa is open at contact a of the switch MLS and its branch through switch ESS and conductor 208 is open at bridge 211 as described above. Under these conditions, no circuit is energized for the solenoid 115 and mechanical cycles do not occur. Also, as the path along conductor 216—contact c of relay OR—conductor 213 is open at bridge 209, there is no energization of solenoids CC and WS, and neither counting nor water replenishment occur; and no energization of the operation relay OR.

When the adjustment for the articles has been effected labels can be introduced to the machine, and the switch MLS moved to its right-hand position. The machine then acts automatically as set out in A and B above.

(D) *Counting and Wetting Devices*

In the above description, it has been brought out that the solenoids CC and WS are not energized while envolepes only are being fed, nor when relay LSR moves in response to the presence of a proper label at switch LS. Furthermore, when neither an envelope nor a proper label is presented, there is no energization of these solenoids.

When a proper label is present, and has acted through switch LS and relay LSR to cause finger 17 to permit an envelope to pass, and this envelope encounters switch ESS so that the solenoid 115 is energized to start the mechancial cycle for applying this proper label to the envelope, and a path is also established from conductor 202 through solenoids CC and WS, by conductor 216—contact c of relay OR—conductor 213—bridge 209 to conductor 210 as above; so that counting is accomplished and water replenishment begun. Thereafter the path through solenoid 215 of relay OR is closed by 214—225 after the cycle has begun, and thence by 213—bridge 209—210—bridge 211—208—switch ESS—221—contact a of switch MLS—203; and the relay OR moves so that its contact c opens the circuit between conductors 216 and 213, wherewith the solenoids CC and WS are no longer energized along the path 216—contact c of relay OR—213 and thence as above through bridge 209. The water valve closes and the counter mechanism retracts to readiness for a new counting operation.

In operation, with the parts in the positions shown in FIGS. 3 and 4, an article E such as an envelope is fed toward the right in these figures, from the stack structures of FIGS. 1 and 2, until its leading edge engages between the top driven rollers 19 and the first pair of stage rollers 55. Depending upon the thickness of the article, the left-hand end of the stage body 50 is forced downward more or less, as the article is gripped by the rollers, against the action of the spring means 60 at the left-hand end of the stage: noting that for thick envelopes, magazines, etc., the adjustable limit stops 180 may be set to hold the stage at a correspondingly lower level relative to the top rollers 19 and the table 40, to reduce the amount of downward stage movement, to give a freer entry of the article between the rollers 19, 55, and to reduce shock and noise. The downward movement of the stage body 50, for the first envelope, is a rocking essentially about a horizontal axis defined by the engagement of the right-hand stop 169 in FIG. 3: thereafter as the article advances along the stage, the right-hand end of the stage moves downward against the right-hand spring means 60, then when the trailing edge of the envelope has passed a mid-point of the length of the stage, the left-hand spring means 60 lifts the left-hand end of the stage again, and finally when the article leaves the last or right-hand pair of rollers 55, the right-hand end of the stage is raised by a rocking motion about a fulcrum essentially determined by the left-hand position adjustment means 180. The adjustment means 180, 169 are active essentially in upright planes through the axes of the first and last pairs of stage rollers 55.

As the article moves past the top feed roller 19 and along the stage, its leading edge encounters the beveled left-hand edge of the pad plate 87 and is guided up onto the pad plate. The article engages and moves the arm 102 and therewith causes opening of the switch 103 so that (FIG. 9) the circuit from conductor 202 is opened, and the solenoid 92 is de-energized, and the spring 88 raises the pad plate 87 about its pivot 86 into the position shown in FIG. 3.

As the stage body 50 moves downward, the pivot point established by the intermediate shaft 54 for the U-shaped member 66 and the cam piece 71 is likewise moved downward; but the bodily downward movement of the cam piece 71 is prevented by its supporting stop 73, and the member 66 is detained by the spring 77 so that it rocks with the member 66. With the downward movement of the stage body 50, a couple of forces are established at vertical lines through the pivot 54 and the stop 73 which tend to rock the cam piece 71 with its edge sliding along the stop 73, and therewith the member 66 is also rocked in the same direction about the pivot 54, wherewith the shaft 67 and the roller 68 are held at essentially the same level as before. During the rocking of the member 66, the gears 78, 79, 80 (FIG. 7) remain in mesh and the roller 68 continues driven. When the article has been advanced by the stage rollers 55 until it engages the roller 68, this roller 68 is also forced downward, with a rocking of the member 66 relative to the cam piece 71 and against the action of spring 77, for receiving the article: when the article has passed, the spring 77 acts to restore the member 66 and the roller 68 to the former position, being limited by the engagement of pin 76 in the end of the arcuate slot 75; and when the article leaves the last stage rollers 55 and the stage body goes back to its original raised position, the weight of the cam piece 71, the member 66 and the roller 68 cause these parts to rock relative to the stage body about the axis 54 and the cam edge 72 slides along the stop 73 back to its original position.

The downward movement of the punch 35 with the label at its lower surface, causes the label to be brought into contact with the wetted part of the top area of the article with the article supported opposite the right-hand edge of the label by the action of roller 68; and supported at a point about one-third of the length of the punch, in the illustrated form, from this right-hand edge of the label, by the edge 87a of the pad plate 87. Further downward movement of the punch effects any necessary flattening of the label and its pressing upon the envelope at these regions, so that firm adhesion is attained, without objectionable slippage of the label relative to the article; with the roller 68 yielding against the action of the spring 77, and the pad plate 87 yielding against the action of the spring 88. As the article continues to advance, by the action of the stage rollers 55, ironing or smoothing effects are produced by the roller 68 and the pad plate 87 for pressing the article upward against the label. The punch, with the illustrated showing, is still moving downward, so that the pad plate 87 is being pressed lower and lower, rocking about its pivot 86 until its upper surface is parallel to the lower surface of the punch 85, and finally the pressure causes the edge 87a of the pad plate to move away from the punch surface, so that the pad plate adjacent its beveled edge 87b exerts the major pressure of the pad plate upon the article and assures a tight engagement of the article with the left-hand edge of the label. With the advancement of the article and label, which occurs during these events, the roller 68 is pressing upward against the envelope with greater and greater force as the punch 35 descends, and assures full contact of the label with the wetted surface so long as the punch is in a lower position. As the punch 35 moves upward again, the roller 68 and the pad plate edge 87a follow the movement and maintain pressure on the article for substantially the time during which the label moves beneath the punch aperture.

If an improper label, so designated by a perceptible such as the aperture 20 therein, comes beneath the label switch LS, then as described above, the switch LS acts to prevent the feeding of an article, but procures the initiation of a cycle of label advancement and clutch movement. Since no article is present, the arm 102 remains raised and the switch 103 closed; the circuit from conductor 223 through solenoid 92 energizes the solenoid 92 so that the pad plate 87 is drawn downward into the top of the stage body and out of engagement by the punch 35 during its descent and return. The roller 68 remains in its raised position until encountered by the improper label which has been severed and delivered downward by the punch: and the rotation of the roller 68 now causes this label to slide toward the right along the bottom surface of the descending punch, and ultimately to be moved by the roller 68 until this improper label has been moved from the punch aperture. In practice, the improper labels are sometimes projected along the stage body by a later article and out of the machine, and sometimes come to rest on the top of the stage body: in either case an improper label is not held in any position in which it partly underlies the punch aperture, and in which a later proper label can be delivered onto it wherewith the article would then have a proper label partly adhered thereto and an improper label partly adherent and underlying the proper label.

It will be understood that the utilized application of the invention to the labeling of envelopes is illustrative; and that the invention can be employed in many ways within the scope of the appended claims.

What is claimed is:

1. A labeling apparatus comprising a support, means for feeding an article past a labeling region, means for advancing a label to the labeling region, said feeding means including a frame movable toward and from the position of a label in said labeling region and a first driven roller on the frame for engaging the article whereby the frame and roller are moved away from the said label position, means for urging the frame and first roller toward said label position, a second driven roller and means supporting the same for movement relative to the frame and to said label position, and means on the support for detaining the said second driven roller when the frame is moved away from the label position.

2. A labeling apparatus comprising a support, means for feeding an article past a labeling region, means for advancing a label to the labeling region, means for moving the label into engagement with the article while both are in the labeling region, a frame movable relative to the support toward and from the label, a lever pivoted on the frame, a driven roller mounted on an axis on said lever which is eccentric to the lever pivot, said label moving means being effective to engage said roller in the absence of an article and a label, whereby to move the lever and roller relative to the frame and the support, and means acting upon said lever tending to oppose the said movement of the lever and roller.

3. A labeling apparatus as in claim 2, in which the label is present as a part of a label strip, and in which said label moving means is a punch movable transversely to the directions of label feeding and article advancement for severing the label from the strip and moving the same toward said roller.

4. A labeling apparatus as in claim 2, in which the roller is located beneath the end of the punch which is downstreamward relative to the direction of article feeding.

5. A labeling apparatus comprising a support having a surface for receiving labels, a stage and springs for urging said stage toward said surface, driven feed rollers on the stage for feeding an article past an opening in said surface, means for advancing a label along said surface to a position opposite said opening, a punch for moving the label through the opening and against an article, a driven spring pressed second roller on the stage in the path of movement of the punch, means responsive to a coding part of label area and effective upon presence of a label having a rejection coding at said area to procure a punch movement for moving such marked label into contact with said second roller whereby the said marked label is moved away from beneath the punch.

6. A labeling apparatus as in claim 5, including means responsive to presence of an article at the label region, a device for pressing the article toward the punch, and means controlled by said responsive means for retracting said pressing device in the absence of an article at the label position, whereby said pressing device is rendered ineffective to prevent the movement of said marked label by said second roller.

7. A labeling apparatus comprising a support, means on the support for advancing a label to a labeling region, means on the support for feeding an article past the labeling region, a device for moving the label toward the article when both are in said region, a pivoted member and a spring for urging the same for pressing the article toward the said device, a sensor element responsive to a coding part of the label, and means controlled by the sensor element for detaining the pivoted member.

8. A labeling apparatus comprising a support, means on the support for feeding an article past a labeling region, a device for moving successive labels into position for contact with an article when present at said labeling region, a sensor element responsive to a coding part of the label, means controlled by said sensor element for preventing the feeding of an article to the labeling region when the label present for movement by said device has a coding for rejection, and means for moving said label from the labeling region prior to movement of an article to said labeling region.

9. A labeling apparatus as in claim 8, in which the article feeding means includes a frame and spring means for urging the frame toward the label moving device, a pad plate pivoted on the frame and means urging the said pad plate toward the label moving device, and means controlled by said sensor element for retracting the pad plate away from said device.

10. A labeling apparatus as in claim 9, in which the said moving meann includes a lever pivoted on the frame and a driven feed roller mounted on said lever, and means on the support and frame for controlling the position of the said driven feed roller.

11. A labeling apparatus as in claim 8, in which the label moving means includes a driven label feed roller positioned opposite the portion of the label moving device which is downstreamward relative to the direction of article travel.

12. A labeling apparatus as in claim 11, in which the driven feed roller is pivotally mounted, and a spring is provided for urging the said feed roller toward the label moving device.

13. A labeling apparatus as in claim 8, in which the label moving device includes a punch movable into the labeling region and having a lower surface inclined relative to the direction of article movement, and in which the article feeding means includes a spring-mounted frame having driven rollers thereon, a lever pivoted on said frame and a spring for urging the lever to press an article toward said punch, said lever having its downstreamward end beneath the punch and being movable by the punch against the action of its said spring; and in which the article moving means includes a driven feed roller, a lever pivoted on the frame at an axis opposite the punch and supporting the said feed roller beneath the downstreamward edge of the punch, and a spring for urging the said feed roller toward the punch.

14. A labeling apparatus comprising a support, means on the support for feeding an article past a labeling region, a device for moving a label into contact with an article in said labeling region, a sensor element responsive to a coding part of the label, said article feeding means including a spring-supported frame yieldable as an article moves past the same, a first lever pivoted on the frame and a driven feed roller eccentrically mounted on said first lever, a second lever pivoted on the frame, a spring connecting said levers for urging said feed roller toward the label moving device, and means on the support cooperative with said second lever during movements of the frame for establishing the position of said driven roller.

15. A labeling apparatus as in claim 13, in which the levers include stop means for limiting the movement urged by said lever spring.

16. A labeling apparatus comprising a support including a plate, means for feeding an article along one surface of the plate and past a labeling region and including a movable stage with driven feed rolls thereon, means for advancing a label to the labeling region, said plate having an aperture at the labeling region and said label advancing means including a member for moving a label through the aperture and into contact with an article present in said labeling region, a rockable plate pivoted on said stage, and resilient means acting upon the rockable plate for urging the same toward said support plate, said rockable plate being positioned for movement in said labeling area whereby to afford support to the article while the label is being applied thereto, the movable edge of said rockable plate being positioned adjacent the downstreamward end of said member.

17. A labeling apparatus as in claim 16, in which the member has a label-engaging surface directed at an angle to the direction of feeding of the article, and in which the pivot mounting of said rockable plate is located upstreamward of said member and is effective firstly during the movement of said member with a label on said surface to effect pressure by the downstreamward end of the member against an article in said labeling region whereby the part of the article adjacent said downstreamward end of the member is pressed against the label, said pivot mounting thereafter permitting the rockable plate to yield under the pressure of the said member and to assume a position for pressing the article against the upstreamward end of the label on said member.

18. A labeling apparatus comprising a support having a plate, a stage having a plurality of pairs of article feeding rolls along its length, means for delivering an article beneath the plate and to the reception end of the stage, a resilient device at said reception end effective for urging the stage toward said plate and effective to permit rocking of the stage about a lengthwise axis thereof, resilient devices at the discharge end of the stage spaced transversely from one another relative to the direction of movement of an article upon said rolls, a driven roller effective for feeding the article along the stage, means for mounting said driven roller whereby the same may move relative to the support and relative to said stage, and means urging the driven roller toward said plate independently of the position of the stage, said driven roller being positioned between the lines of said pairs of rollers.

19. A labeling apparatus as in claim 18, in which the mounting means for said driven roller includes levers pivoted on the stage, and means are provided on the support for controlling the position of said driven roller relative to said plate independently of the position of the stage.

20. A labeling apparatus comprising a support, means on the support for feeding an article past a labeling region, a device for moving a label into contact with an article in said labeling region, a sensor element responsive to a coding part of the label, means controlled by said sensor element for preventing the feeding of an article to the labeling region when the label present for movement by said moving device has a coding for rejection, means for removing a label so coded from said labeling region, and a device connected with the said sensor element for counting the articles which receive labels from said moving device.

21. A labeling apparatus comprising a support, means on the support for feeding an article past a labeling region, a device for moving successive labels into said labeling region, a sensor means responsive to a coding part of the label, means controlled by said sensor element for preventing the feeding of an article to the labeling region when the label present for movement by said moving device has a first type of coding at said part and for effecting the feeding of an article to the labeling region when the label present has a second type of coding at said part, and means for removing from said labeling region a label having the said first type of coding.

22. A labeling apparatus as in claim 21, in which the article feeding and label removing means are coordinately driven, and said preventing means includes an instrumentality to initiate article feeding immediately upon detection by said sensor means of a label having the said second type of coding thereon.

23. A labeling apparatus comprising means for advancing an article past a labeling region, means for preventing movement of the article to the labeling region, means for advancing a label to the labeling region, said label advancing means including a cyclically acting device for procuring advancement and delivery of a label during each cycle, said label advancing means being effective for advancing a proper or an improper label to the labeling region, means differentially responsive to each label at its approach to the labeling region and effective to determine the presence of a proper or an improper label and to obtain actuation of said article movement preventing means when the presence of an improper label is determined, a counting device, a first switch responsive to the presence of an article which has been moved past said movement preventing means and means controlled by said first switch for procuring a said cycle of operation, a normally open second switch included in said latter controlled means and connected to said differentially responsive means to be closed when a proper label is present and to be closed and then reopened when an improper label is determined, a normally closed third switch connected to be opened by the presence of an article at the labeling region, and a normally closed fourth switch connected to said differentially responsive means to be opened when a label approaches the labeling region and at a time prior to the closing of said first switch, and circuit means including said second switch and two branches in one of which is the first switch and in the other of which are the third and fourth switches in series, said circuit means being connected for actuating said counting device.

24. A labeling apparatus comprising means for advancing an article past a labeling region, means for preventing movement of the article to the labeling region, means for advancing a label to the labeling region, said label advancing means including a cyclically acting device for procuring advancement and delivery of a label during each cycle, means responsive to the presence of a label for obtaining actuation of said article movement preventing means to effect feeding of an article, a device responsive to the presence of an article which has been moved past said movement preventing means and means controlled by said article responsive device for procuring a said cycle of operation, said label responsive means also including devices for detecting a coding mark upon an improper label and effective upon such detection to procure a said cycle of operation and therewith maintain said movement preventing means in preventing condition, a device for moving the article toward the label advancing means independently of said article advancing means and resilient means for so moving the same, electromagnetic means for retracting the said article moving device against the action of the said resilient means, a normally closed switch positioned for engagement by the article while in the labeling region and to be opened thereby, and a circuit including said electromagnetic means and said normally closed switch effective to move the said article moving device away from the label advancing means during a cycle initiated by said label responsive means upon detection of an improper label.

25. A labeling apparatus comprising means for feeding articles past a labeling region, means for advancing a succession of labels to the labeling region, a device responsive to a coding part of the label area prior to contact of the label with the article for detecting the presence of a label coded for being rejected without application to an article, a device normally effective for pressing articles toward the label at the labeling region, said advancing means including a device for shifting the labels from the position at which detection occurs and for bringing the non-rejected labels into contact with articles and therewith cooperative with said pressing device for procuring the affixing of the non-rejected labels to articles, and means controlled by said responsive device for retracting said pressing device when a label coded for rejection is detected.

26. A labeling apparatus comprising means for feeding articles past a labeling region and including a movable support, means for advancing a succession of labels to the labeling region, a device responsive to a coding part of the label area prior to contact of the label with the article for detecting the present of a label coded for being rejected without application to an article, said feeding means including a driven roller movably mounted on the support for engaging the article and movable thereby away from the position of a label in the labeling region, means for urging the driven roller toward said label position, a device movable on the support with the roller for pressing the article toward the said label position and moved from the label position by the action of the article, said advancing means including a device for shifting the labels from the position at which detection occurs and for bringing the non-rejected labels into contact with articles and therewith cooperative with said pressing device and said roller for procuring the affixing of the non-rejected labels to articles, and means controlled by said responsive device for retracting said pressing device when a label coded for rejection is detected.

27. A labeling apparatus comprising a support, means for feeding a flexible article past a labeling region, means for advancing a label to the labeling region, said article feeding means including a structure with rollers thereon for supporting the article while at the labeling region, spring means for urging the structure against the article, a device pivotally mounted on the structure and located at the labeling region, spring means acting between said support and device for pressing the device against an area of the article opposite the label and the device being effective to yield independently of the said structure when the label advancing means presses the label against the article, an additional roller and means pivoted on the structure for supporting the additional roller, and spring means reactive against the support and the additional roller for pressing the article and label together as they are fed away from the labeling region.

References Cited in the file of this patent

UNITED STATES PATENTS

| | | |
|---|---|---|
| 2,196,792 | Gasca | Apr. 9, 1940 |
| 2,685,381 | Essmann | Aug. 3, 1954 |
| 2,754,022 | Schneider | July 10, 1956 |